Patented Sept. 27, 1932

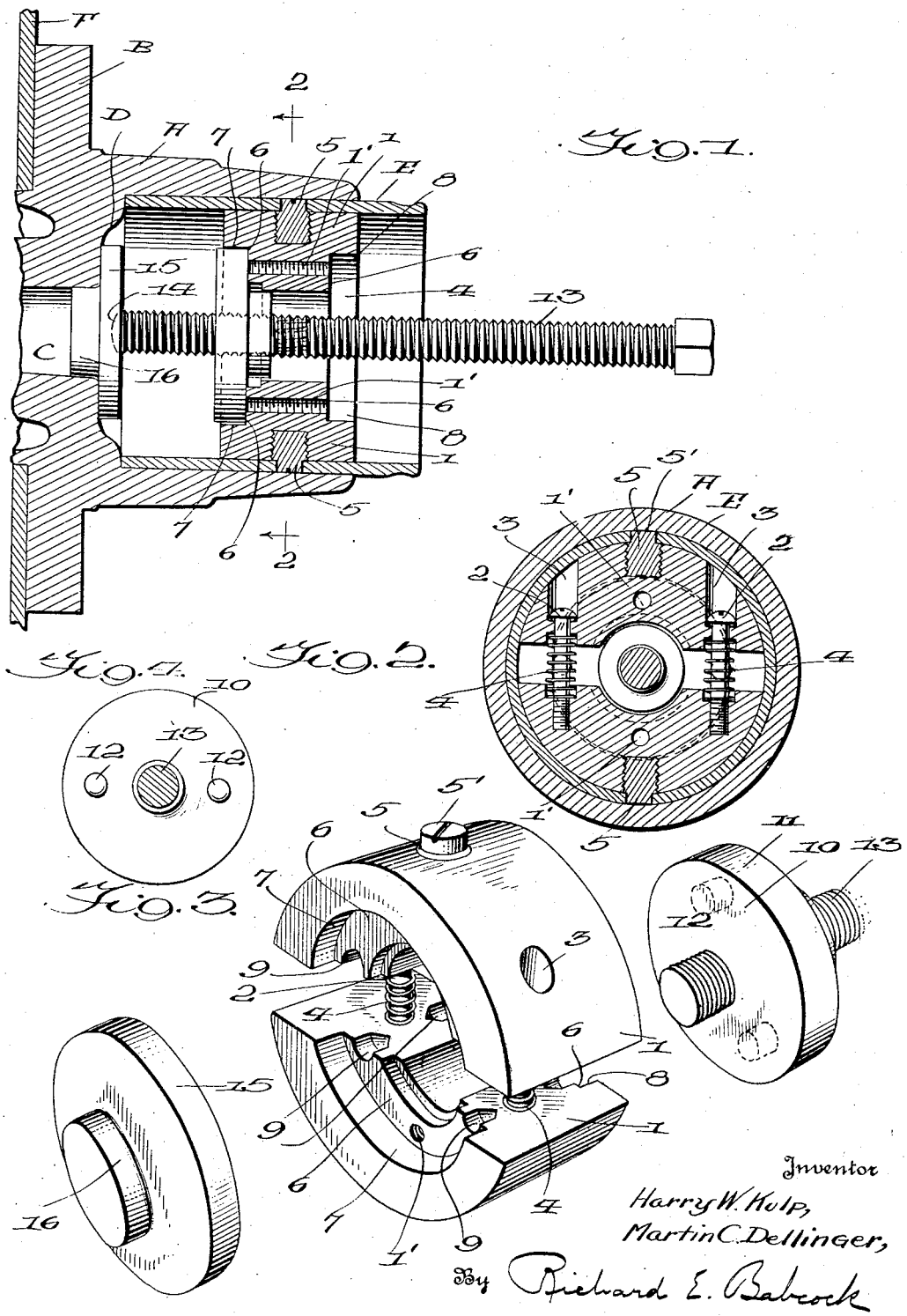

1,879,335

UNITED STATES PATENT OFFICE

HARRY W. KULP AND MARTIN C. DELLINGER, OF LANCASTER, PENNSYLVANIA

SLEEVE PULLER

Application filed August 3, 1931. Serial No. 554,924.

This invention relates to roller bearing sleeve pullers.

The primary objects of the present invention are to provide a tool in which the parts engaging in the sleeve will be solidly and positively held in such position during the pulling operation; to provide in such a part a composite sleeve engaging unit in combination with a pulling disk engaging radial walls of said unit to shove said unit in an axial direction and engaging axially extending walls to hold the members of said unit in spread relation; to provide said unit with two operative end sockets to selectively cooperate with said disk and to provide for operating on a plurality of different internal diameter sleeves, making the walls surrounding said sockets of different diameter to give a plurality of relative radial positions of adjustment of the sleeve engaging elements of said unit; to provide a tool all thrusts and pulls of which are exerted on the interior of the bearing sleeve and the interior of the element in which the sleeve is positioned; to provide for the interchangeability of the radially extending lugs for engaging the usual holes in the sleeve, whereby different sizes of such lugs may be employed as required by the sizes of such holes in any particular sleeve; to provide simple means for forcing the members of the engaging unit radially away from each other when disposed in the interior of the sleeve to engage in the holes thereof.

In the accompanying drawing:

Figure 1 represents a fragmentary longitudinal section of a wheel hub with a tool embodying our invention applied thereto;

Figure 2, a sectional view on the line 2—2 of Figure 1, looking in the direction of the arrows;

Figure 3, a perspective, "exploded" view of the units of our invention, the thrust or jack screw being broken away; and Figure 4, a top plan view of the disk 10.

Referring now in detail to the drawing A designates a wheel hub having a wheel attaching flange B to which the hub plate F, broken away, of the wheel is to be attached by any suitable means, as by stud bolts, not shown; C designates the axle bore of said hub; D, the radially extending inner end wall or face of the bearing bore or housing in said hub; and E, the roller bearing sleeve tightly mounted in said housing and having a portion extending beyond the end of said housing, in accordance with the construction embodied in the rear wheel or drive wheel assemblies of several types of automobiles now in extensive use in this country, said sleeve being formed with diametrically opposite perforations.

The tool of this invention comprises three main units, being the radially expansible sleeve engaging unit, the thrust block, and the cooperating jack screw and pulling disk adapted to exert force in opposite directions on said thrust block and sleeve engaging unit.

The sleeve engaging unit consists of two preferably arcuate relatively radially movable blocks 1 held in relatively movable associated relation by means of horizontally disposed screws 2 having their screw-threaded ends engaging in one of said blocks and having their heads 2 disposed in cooperating bores 3 extending inward from the peripheral face of the other block, said heads of said screws 2 engaging against the walls of the inner ends of said bores 3 respectively to limit the radial spreading movement of said members 1, and helical springs 4 being mounted respectively about said screws 2 between the opposed faces of said members 1 to yieldingly force said members 1 away from each other.

Said members 1 will be provided at diametrically opposite points with internally screw-threaded bores extending radially inward from their external faces, said screw-threaded bores being adapted to receive externally screw-threaded plugs 5. The radially outer end portions of said plugs 5 constitute the sleeve engaging lugs 5' which fit in the corresponding diametrically opposed perforations in the sleeve E, as illustrated in Figures 1 and 2. Said lugs 5' will of course have smooth external peripheral faces and will be of such size as to be received in said perforations of the sleeve E and will preferably make a snug fit therein and to this end the radially outer ends of the lugs 5' are slotted for engagement by a screw driver to facilitate their removal and insertion so that the proper size for a given sleeve may be easily inserted in the blocks 1.

Each said block 1 has each end formed with a radially extending face 6, the faces 6 of each of the opposed ends of the blocks lying in the same radial planes respectively, whereby the faces 6 of the inner ends of said blocks 1 as disposed in a sleeve E will be engaged by the opposed radial face of the pulling disk 10 and the walls extending axially about said faces 6 will be arranged in pairs at each end of the sleeve engaging unit, the walls 8 extending axially at one end of the unit being of appreciably greater thickness in a radial direction than the walls 7 extending axially in the opposite direction from the other end of said unit, said walls 6 and 7 all having curved radially inner faces adapted to engage for some portion of their area at least on diametrically opposite points of the peripheral face 11 of the pulling disk 10, said peripheral face 11 being as nearly truly circular as is practicably attainable under usual large quantity manufacturing conditions applicable to tools of this type, which are not required to be tools of exact precision.

Preferably each end of each block 1 will be formed with an arcuate recess or notch 9 extending axially from the face 6 and of such arcuate form as to partially receive and cooperate with the pins 12 axially extending from the opposed face of the disk 10 to hold said disk 10 against rotation with the jack screw 13 upon which it is mounted and with which it has screw thread engagement for movement thereon endwise thereof.

The thrust block 15 is to be positioned in the inner end of the interior of the hub A with its reduced axially extending circularly formed portion 16 fitting in and centered by the axle bore C and has its radial face opposed to the pulling disk 10 formed with a centrally disposed centering concave depression 14 to receive and center the correspondingly formed inner end of the thrust screw 13.

Preferably each of the members 1 will be formed with an internally screw-threaded axially extending small bore 1' into which may be threaded or engaged any convenient rod or similar element, not shown, whereby said members 1 may be conveniently moved radially toward each other for purposes of insertion into, or withdrawal from, the roller bearing sleeve E.

In operation the thrust block 15 will first be positioned in the hub, next the curved end of the jack screw 13 carrying the pulling disk 10 will be inserted in the hub, the disk 10 being turned about the jack screw 13 so as to move it closely adjacent to said curved end, and thereafter the sleeve engaging unit will be inserted in the sleeve E and moved axially thereof and partially turned or rotated therein until the lugs 5' register with and slip into the corresponding perforations in said sleeve E. Thereafter the screw 13 will be turned in the proper direction to cause the disk 10 to move away from the thrust plate or block 15 until the said disk 10 is received between the walls 7 or 8 as the case may be, at which time the mechanic will see that the pins 12 are received between the opposed faces of the blocks or members 1 so that the disk 10 may firmly seat against the radially registering pair of faces 6. Thereafter rotation of the screw 13 in said direction will be continued until the pulling of the sleeve E has been completed.

From the foregoing it will be seen that a very large jack screw 13 capable of withstanding great twisting and turning power or leverage may be employed; that the thrust against the hub A is exerted on the heaviest and strongest portions thereof; that the thrust plate 15 and the pulling disk 10 may be made of any desired thickness to withstand practically any pull or thrust which may be exerted thereon; and that the force is applied in opposite directions to the strongest portion of the hub and to the sleeve slidably mounted therein.

While we have shown and described in this application the blocks 1 as being nearly semi-circular in shape this is not essential, it sufficing if they have diametrically opposed portions to radially support the lugs 5' and have their outer faces adjacent said lugs of such contour as to conform to the opposed inner face portions of the sleeve E adjacent the diametrically opposed perforations thereof.

Also, while it is preferred, it is not essential that the recesses 9 be provided, nor the pins 12 as the frictional engagement between the opposed face of the disk 10 and the faces 6 would largely prevent rotation of the disk 10 with relation to the sleeve pulling unit.

Having thus described our invention, what we claim is:

1. A wheel hub roller bearing sleeve puller consisting of a thrust block having a portion fitting in a bore in said hub and having a portion engaging a radial face extending from adjacent said bore, and a sleeve engaging unit consisting of a pair of relatively movable blocks formed at each end with radial faces extending in the same radial planes respectively and having pairs of walls of different thicknesses in a radial direction extending axially from the respective pairs of radial faces, said blocks having their outer faces straight in an axial direction and arcuate in a peripheral direction and being formed with arcuate recesses extending axially inward from the ends of the respective radial faces, means secured in one of said blocks and slidable in the other block for connecting said blocks for relative radial movement and for limiting the separation of said blocks in a radial direction, yielding means tending to force said blocks apart in a radial direction, and removable means projecting radially at diametrically opposite points from the arcuate radially outer face portions of said blocks for engaging in the corresponding perforations in the sleeve to be pulled, in combination with a centrally axially bored internally screw-threaded disk having a radial face adapted to engage one or another of the pairs of radial faces of said blocks according to the internal diameter of the sleeve to be pulled and to engage at diametrically opposite points of its peripheral face the radially inner faces of one or another of said pairs of axially extending walls according to the internal diameter of the sleeve to be pulled, a stop pin extending axially from said disk and adapted to engage in one of said recesses, and a jack screw engaging in the screw-threaded bore of said disk, and having its threaded end portion rounded and seated in and centered by a corresponding central depression in the opposed face of said thrust plate, said jack screw extending axially outwardly between, and centrally, of said blocks.

2. A wheel hub roller bearing sleeve puller consisting of a thrust block having a portion fitting in a bore in said hub and having a portion engaging a radial face extending from adjacent said bore, and a sleeve engaging unit consisting of a pair of relatively radially movable blocks and formed at each end with radial faces extending in the same radial planes respectively and having pairs of walls of different thicknesses in a radial direction extending axially from the respective pairs of radial faces, said blocks having their outer faces straight in an axial direction and arcuate in a peripheral direction, means secured in one of said blocks and slidable in the other block for connecting said blocks for relative radial movement and for limiting the separation of said blocks in a radial direction, yielding means tending to force said blocks apart in a radial direction, and removable means projecting radially at diametrically opposite points from the arcuate radially outer face portions of said blocks for engaging in the corresponding perforations in the sleeve to be pulled, in combination with a centrally axially bored internally screw-threaded disk having a radial face adapted to engage one or another of the pairs of radial faces of said blocks according to the internal diameter of the sleeve to be pulled and to engage at diametrically opposite points of its peripheral face the radially inner faces of one or another of said pairs of axially extending valves according to the internal diameter of the sleeve to be pulled, a stop pin extending axially from said disk and adapted to engage an axially extending face of one of said blocks and a jack screw engaging in the screw-threaded bore of said disk, and having its threaded end portion rounded and seated in and centered by a corresponding central depression in the opposed face of said thrust plate, said jack screw extending axially outwardly between, and centrally, of said blocks.

3. A wheel hub roller bearing sleeve puller consisting of a thrust block having a portion fitting in a bore in said hub and having a portion engaging a radial face extending from adjacent said bore, and a sleeve engaging unit consisting of a pair of relatively radially movable blocks formed at one end with radial faces extending in the same radial plane and having a pair of walls extending axially from the respective radial faces, said blocks having their outer faces straight in an axial direction and arcuate in a peripheral direction, means secured in one of said blocks and slidable in the other block for connecting said blocks for relative movement and for limiting the separation of said blocks in a radial direction, yielding means tending to force said blocks apart in a radial direction, and means projecting radially at diametrically opposite points from the arcuate radially outer face portions of said blocks for engaging in the corresponding perforations in the sleeve to be pulled, in combination with a centrally axially bored internally screw-threaded disk having a radial face adapted to engage said radial faces of said blocks and to engage at diametrically opposite points of its peripheral face the radially inner faces of said pair of axially extending walls, and a jack screw engaging in the screw-threaded bore of said disk, and having its threaded end portion rounded and seated in and centered by a corresponding central depression in the opposed face of said thrust plate, said jack screw extending outwardly between, and centrally, of said blocks.

4. A wheel hub roller bearing sleeve puller comprising a sleeve engaging unit comprising a pair of relatively radially movable blocks and formed at one end with radial faces extending in the same radial plane and having a pair of walls extending axially from the respective radial faces, said blocks having their outer faces straight in an axial direction and arcuate in a peripheral direction, means secured in one of said blocks and slidable in the other block for connecting said blocks for relative radial movement, and means projecting radially at diametrically opposite points from the arcuate radially outer face portions of said blocks for engaging in the corresponding perforations in the sleeve to be pulled, in combination with a centrally axially bored internally screw-threaded disk having a radial face adapted to engage said pair of radial faces of said blocks and to engage at diametrically opposite points of its peripheral face the radially inner faces of said pair of axially extending walls, and a jack screw engaging in the screw-threaded bore of said disk and adapted to engage a fixed surface with its inner end.

5. A wheel hub roller bearing sleeve, comprising a sleeve engaging unit comprising a pair of relatively radially movable blocks formed at one end with radial faces extending in the same radial plane and having a pair of walls extending axially from the respective radial faces, said blocks having their outer faces straight in an axial direction and arcuate in a peripheral direction, and removable means projecting radially at diametrically opposite points from the arcuate radially outer face portions of said blocks for engaging in the corresponding perforations in the sleeve to be pulled, in combination with a centrally axially bored internally screw-threaded disk having a radial face adapted to engage said pair of radial faces of said blocks and to engage at diametrically opposite points of its peripheral face the radially inner faces of said pair of axially extending walls, and a jack screw engaging in the screw-threaded bore of said disk and adapted to exert thrust against a relatively fixed element.

6. A wheel hub roller bearing sleeve puller comprising a sleeve engaging unit comprising a pair of relatively radially movable blocks formed at one end with radial faces and having a pair of walls extending axially from the respective radial faces, said blocks having their outer faces straight in an axial direction and arcuate in a peripheral direction and means projecting radially at diametrically opposite points from the arcuate radially outer face portions of said blocks for engaging in the corresponding perforations in the sleeve to be pulled, in combination with a bored internally screw-threaded disk having a radial face adapted to engage said pairs of radial faces of said blocks and to engage at diametrically opposite points of its peripheral face the radially inner faces of said pair of axially extending walls, and a jack screw engaging in the screw-threaded bore of said disk and adapted to exert thrust against a relatively fixed element.

7. A wheel hub roller bearing sleeve puller comprising a sleeve engaging unit comprising a pair of relatively radially movable blocks formed at each end with radial faces extending in the same radial planes respectively and having pairs of walls of different thicknesses in a radial direction extending axially from the respective pairs of radial faces, said blocks having their outer faces straight in an axial direction and arcuate in a peripheral direction, and removable means projecting radially at diametrically opposite points from the arcuate radially outer face portions of said blocks for engaging in the corresponding perforations in the sleeve to be pulled, in combination with a bored internally screw-threaded disk having a radial face adapted to engage one or another of the pairs of radial faces of said blocks according to the internal diameter of the sleeve to be pulled and to engage at diametrically opposite points of its peripheral face the radially inner faces of one or another of said pairs of axially extending walls according to the internal diameter of the sleeve to be pulled, and a jack screw engaging in the screw-threaded bore of said disk and adapted to exert thrust against a relatively fixed element.

In testimony whereof, we have signed our names to this specification at Lancaster, Pennsylvania, this 31st day of July, 1931.

HARRY W. KULP.
MARTIN C. DELLINGER.